(12) United States Patent
Cheng et al.

(10) Patent No.: US 8,750,947 B2
(45) Date of Patent: Jun. 10, 2014

(54) MOBILE DEVICE AND WIDEBAND ANTENNA STRUCTURE THEREIN

(71) Applicant: HTC Corporation, Taoyuan (TW)

(72) Inventors: Chien-Chun Cheng, Taoyuan (TW);
Yu-Che Lin, Taoyuan (TW);
Chung-Ting Hung, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 13/749,780

(22) Filed: Jan. 25, 2013

(65) Prior Publication Data

US 2013/0225234 A1    Aug. 29, 2013

Related U.S. Application Data

(60) Provisional application No. 61/602,843, filed on Feb. 24, 2012.

(51) Int. Cl.
*H04M 1/00* (2006.01)
*H01Q 1/24* (2006.01)
*H01Q 5/00* (2006.01)

(52) U.S. Cl.
CPC ............... *H01Q 5/00* (2013.01); *H01Q 5/001* (2013.01); *H01Q 5/0037* (2013.01); *H01Q 5/0068* (2013.01)
USPC ................. 455/575.5; 343/702; 343/700 MS

(58) Field of Classification Search
CPC ....... H01Q 5/00; H01Q 5/001; H01Q 5/0037; H01Q 5/0068; H01Q 5/01
USPC .......................... 455/575.5; 343/702, 700 MS
See application file for complete search history.

(56) References Cited

U.S. PATENT DOCUMENTS

| | | | |
|---|---|---|---|
| 6,650,294 B2* | 11/2003 | Ying et al. | 343/702 |
| 6,958,730 B2* | 10/2005 | Nagumo et al. | 343/702 |
| 7,170,450 B2* | 1/2007 | Chang et al. | 343/700 MS |
| 7,432,860 B2* | 10/2008 | Huynh | 343/700 MS |
| 7,508,345 B2* | 3/2009 | Pan et al. | 343/700 MS |
| 7,825,863 B2* | 11/2010 | Martiskainen et al. | 343/702 |
| 8,115,686 B2* | 2/2012 | Mumbru et al. | 343/702 |
| 8,125,399 B2* | 2/2012 | McKinzie et al. | 343/746 |
| 2010/0328182 A1* | 12/2010 | Wong et al. | 343/848 |
| 2012/0098721 A1* | 4/2012 | Wong et al. | 343/749 |
| 2012/0262352 A1* | 10/2012 | Wong et al. | 343/728 |
| 2012/0293376 A1* | 11/2012 | Hung et al. | 343/702 |

\* cited by examiner

*Primary Examiner* — Duc M Nguyen
(74) *Attorney, Agent, or Firm* — Birch, Stewart, Kolasch & Birch, LLP

(57) ABSTRACT

A mobile device includes a ground plane, a grounding trace, and a feeding trace. The grounding trace defines a notch, and has a shorted end coupled to the ground plane. The feeding trace is disposed adjacent to the grounding trace, and has a feeding end and an open end. An antenna structure is formed by the grounding trace and the feeding trace. The feeding end of the feeding trace is coupled to a signal source. The open end of the feeding trace substantially extends into the notch of the grounding trace.

17 Claims, 6 Drawing Sheets

MOBILE DEVICE AND WIDEBAND ANTENNA STRUCTURE THEREIN

CROSS REFERENCE TO RELATED APPLICATIONS

This application claims the benefit of U.S. Provisional Application No. 61/602,843, filed on Feb. 24, 2012, the entirety of which is incorporated by reference herein.

BACKGROUND OF THE INVENTION

1. Field of the Invention

The subject application generally relates to a mobile device, and more particularly, relates to a mobile device comprising an antenna structure.

2. Description of the Related Art

With the progress of mobile communication technology, mobile devices, for example, notebook computers, tablet computers, mobile phones, multimedia players, and other hybrid functional portable devices, have become more common. To satisfy the demand of users, mobile devices usually can perform wireless communication functions. Some devices cover a large wireless communication area, for example, mobile phones use 2G, 3G, LTE (Long Term Evolution) and 4G systems and use frequency bands of 700 MHz, 850 MHz, 900 MHz, 1800 MHz, 1900 MHz, 2100 MHz, 2300 MHz, and 2500 MHz. Some devices cover a small wireless communication area, for example, mobile phones use Wi-Fi, Bluetooth, WLAN (Wireless Local Area Network), and WiMAX (Worldwide Interoperability for Microwave Access) systems and use frequency bands of 2.4 GHz, 3.5 GHz, 5.2 GHz, and 5.8 GHz.

When an antenna is designed in a compact mobile device, a designer often faces the problem of insufficient antenna bandwidth. In addition, a user often holds a mobile device by his hand, thereby degrading the performance of an antenna therein.

BRIEF SUMMARY OF THE INVENTION

In one exemplary embodiment, the subject application is directed to a mobile device, comprising: a ground plane; a grounding trace, defining a notch, wherein the grounding trace has a shorted end coupled to the ground plane; and a feeding trace, disposed adjacent to the grounding trace, and having a feeding end and an open end, wherein an antenna structure is formed by the grounding trace and the feeding trace, the feeding end of the feeding trace is coupled to a signal source, and the open end of the feeding trace substantially extends into the notch of the grounding trace.

BRIEF DESCRIPTION OF DRAWINGS

The subject application can be more fully understood by reading the subsequent detailed description and examples with references made to the accompanying drawings, wherein.

DETAILED DESCRIPTION OF THE INVENTION

In order to illustrate the purposes, features and advantages of the subject application, the embodiments and figures thereof in the subject application are shown in detail as follows.

Figure 1:
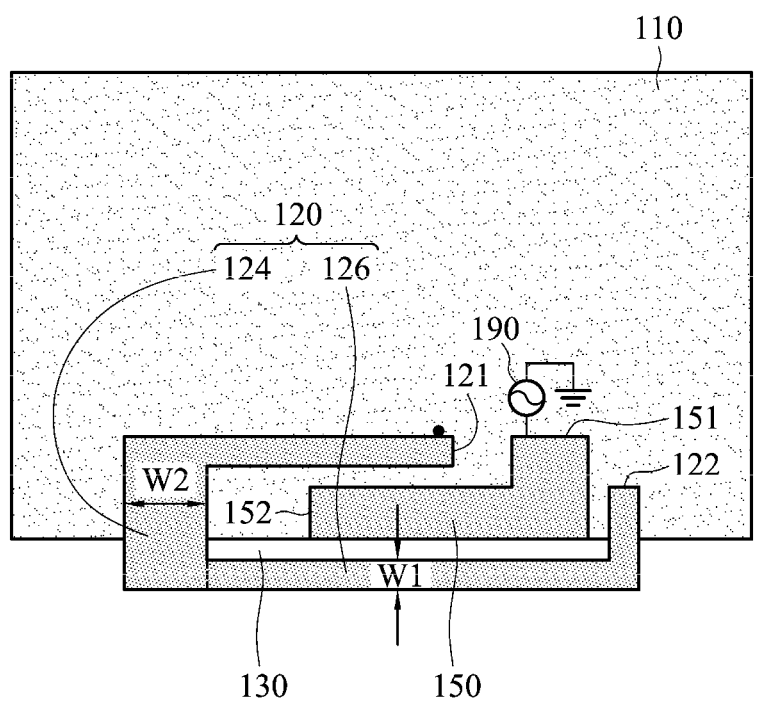
FIG. 1 is a diagram for illustrating a mobile device according to an embodiment of the invention.

FIG. 1 is a diagram for illustrating a mobile device 100 according to an embodiment of the invention. The mobile device 100 may be a smart phone or a tablet computer. As shown in FIG. 1, the mobile device 100 at least comprises a ground plane 110, a grounding trace 120, and a feeding trace 150. The ground plane 110 may be disposed on a dielectric substrate (not shown), such as an FR4 substrate or a system circuit board. The ground plane 110, the grounding trace 120, and the feeding trace 150 are made of conductive materials, such as silver, copper, or aluminum. Note that the mobile device 100 may comprise at least other essential components, such as a processor, an RF (Radio Frequency) module, a touch and display module, and a power supply module.

Geometrically, the grounding trace 120 defines a notch 130. The notch 130 may substantially have a rectangular shape. The grounding trace 120 has a shorted end 121 coupled to the ground plane 110 and an open end 122. In some embodiments, the grounding trace 120 and the ground plane 110 lie on different planes, and the shorted end 121 of the grounding trace 120 is coupled through a spring or a pogo pin (not shown) to the ground plane 110. The feeding trace 150 is disposed adjacent to the grounding trace 120, and has a feeding end 151 and an open end 152. An antenna structure is formed by the grounding trace 120 and the feeding trace 150. The feeding end 151 of the feeding trace 150 is coupled to a signal source 190, and the open end 152 of the feeding trace 150 substantially extends into the notch 130 of the grounding trace 120. The feeding trace 150 can feed signals into the grounding trace 120 by coupling. Similarly, the feeding trace 150 and the ground plane 110 may lie on different planes, and the feeding end 151 of the feeding trace 150 is coupled through another spring or another pogo pin (not shown) to the signal source 190. In the embodiment, the grounding trace 120 substantially has a U-shape, and the feeding trace 150 substantially has an L-shape. However, the subject application is not limited to the above. In other embodiments, the grounding trace 120 and the feeding trace 150 may have other shapes.

More particularly, the grounding trace 120 comprises a bent portion 124 and an extension portion 126. The bent portion 124 is adjacent to the shorted end 121 of the grounding trace 120. The extension portion 126 is adjacent to the open end 122 of the grounding trace 120. In some embodiments, the bent portion 124 substantially has an L-shape, and the extension portion 126 substantially has another L-shape. A width W2 of the bent portion 124 and a width W1 of the extension portion 126 are used to adjust operation bands of the antenna structure, and they will be described in the following paragraph.

Figure 2:
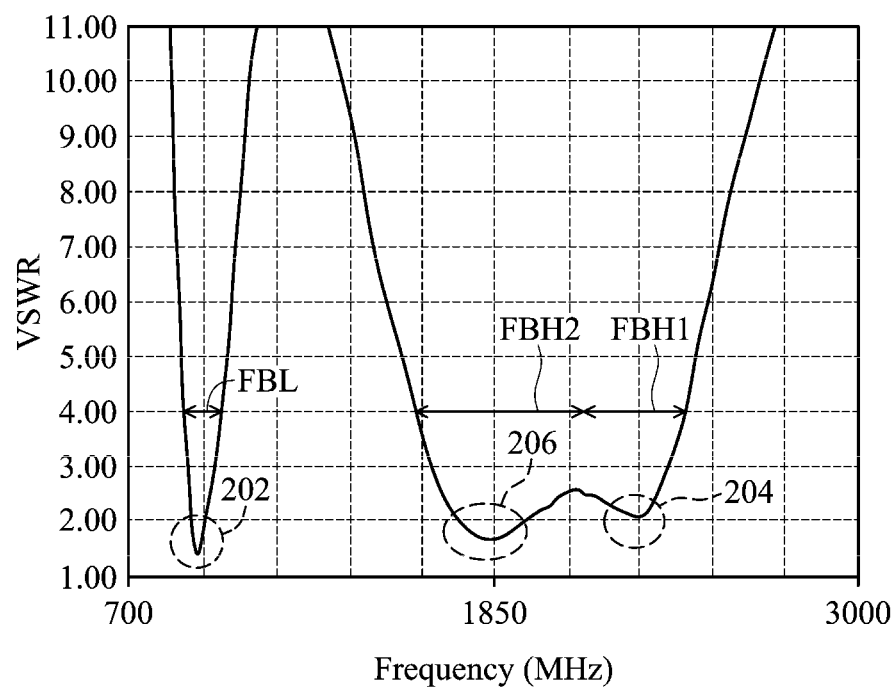
FIG. 2 is a diagram for illustrating a VSWR (Voltage Standing Wave Ratio) of an antenna structure of an mobile device according to an embodiment of the invention.

FIG. 2 is a diagram for illustrating a VSWR (Voltage Standing Wave Ratio) of the antenna structure of the mobile device 100 according to an embodiment of the invention. The horizontal axis represents operation frequency (MHz), and the vertical axis represents the VSWR. As shown in FIG. 1 and FIG. 2, a fundamental resonant mode 202 of the grounding trace 120 is excited to generate a low band FBL, a high-order resonant mode 204 of the grounding trace 120 is excited to generate a high band FBH1, and a resonant mode 206 of the feeding trace 150 is excited to generate another high band FBH2. In the embodiment, the low band FBL is approximately from 824 MHz to 960 MHz, the high band FBH1 is approximately from 2100 MHz to 2400 MHz, and the high band FBH2 is approximately from 1710 MHz to 2100 MHz. Accordingly, the antenna structure of the mobile device 100 can cover GSM850/900/1800/1900/WCDMA Band 1 bands.

In a preferred embodiment, the grounding trace 120 serves as a quarter-wavelength resonator, which is excited by the feeding trace 150. Since the width W2 of the bent portion 124 is different from the width W1 of the extension portion 126, the quarter-wavelength resonator is equivalent to two different impedance devices coupled in series. Refer to FIG. 1 and FIG. 2 together. The ratio (W2/W1) of the width W2 of the bent portion 124 to the width W1 of the extension portion 126 is used to adjust a frequency ratio of the high-order resonant mode 204 to the fundamental resonant mode 202. According to the measurement result, if the ratio (W2/W1) is increased, the frequency ratio of the high-order resonant mode 204 to the fundamental resonant mode 202 will be decreased. Conversely, if the ratio (W2/W1) is decreased, the frequency ratio of the high-order resonant mode 204 to the fundamental resonant mode 202 will be increased. In addition, the resonant mode 206 of the feeding trace 150 can be adjusted by changing the length of the feeding trace 150. A designer can control the operation bands of the antenna structure in the subject application according to the above method.

Figure 3:
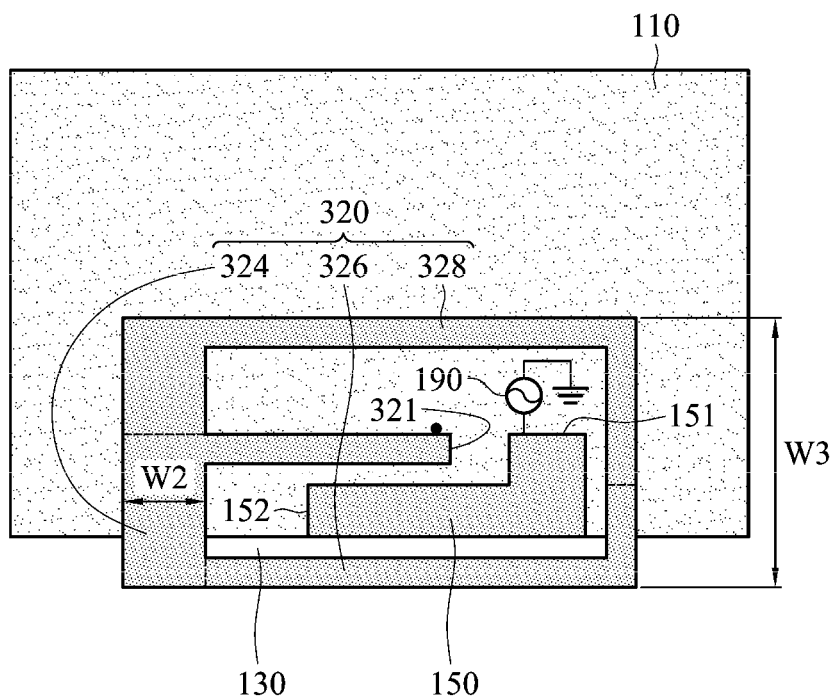
FIG. 3 is a diagram for illustrating a mobile device according to another embodiment of the invention.

FIG. 3 is a diagram for illustrating a mobile device 300 according to another embodiment of the invention. FIG. 3 is similar to FIG. 1. The difference from the embodiment of FIG. 1 is that a grounding trace 320 of the mobile device 300 comprises a bent portion 324 and two extension portions 326 and 328. Similarly, the bent portion 324 is adjacent to a shorted end 321 of the grounding trace 320, and the shorted end 321 of the grounding trace 320 is coupled to the ground plane 110. As shown in FIG. 3, a closed loop is formed by the bent portion 324 and the extension portions 326 and 328. In some embodiments, the bent portion 324 substantially has an L-shape, the extension portion 326 substantially has another L-shape, the extension portion 328 substantially has a C-shape, and the closed loop substantially has a rectangular shape. An antenna structure is formed by the grounding trace 320 and the feeding trace 150. A width W2 of the bent portion 324 and a width W3 of the closed loop are used to adjust operation bands of the antenna structure, and they will be described in the following paragraph.

Figure 4:
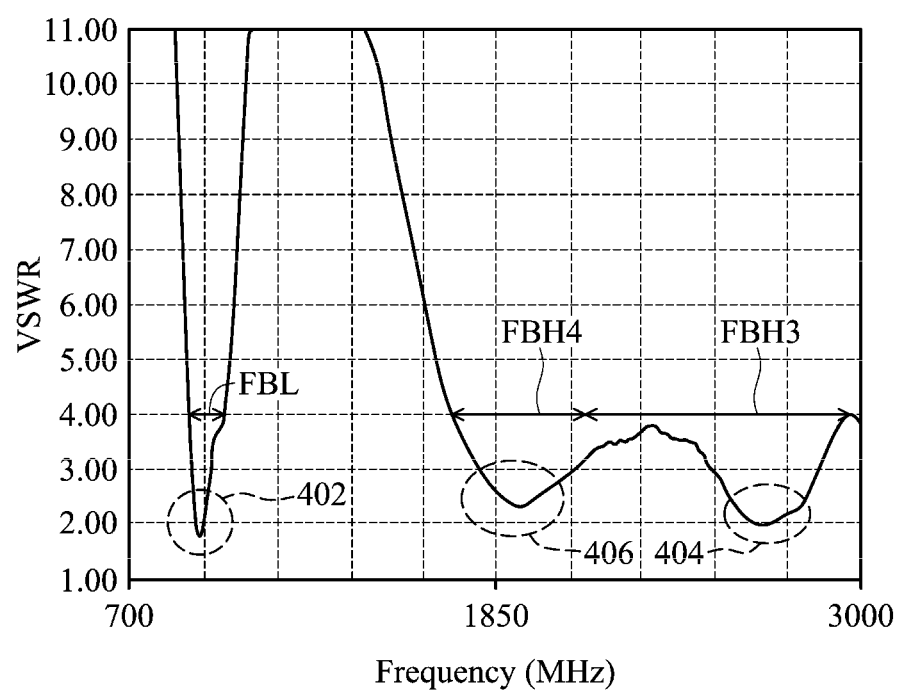
FIG. 4 is a diagram for illustrating a VSWR of an antenna structure of a mobile device according to another embodiment of the invention.

FIG. 4 is a diagram for illustrating a VSWR of the antenna structure of the mobile device 300 according to an embodiment of the invention. The horizontal axis represents operation frequency (MHz), and the vertical axis represents the VSWR. As shown in FIG. 3 and FIG. 4, a fundamental resonant mode 402 of the grounding trace 320 is excited to generate a low band FBL, a high-order resonant mode 404 of the grounding trace 320 is excited to generate a high band FBH3, and a resonant mode 406 of the feeding trace 150 is excited to generate another high band FBH4. In the embodiment, the low band FBL is approximately from 824 MHz to 960 MHz, the high band FBH3 is approximately from 2100 MHz to 2700 MHz, and the high band FBH4 is approximately from 1710 MHz to 2100 MHz. Accordingly, the antenna structure of the mobile device 300 can cover GSM850/900/1800/1900/WCDMA Band 1/LTE, Band 7 bands.

Refer to FIG. 3 and FIG. 4 together. The ratio (W2/W3) of the width W2 of the bent portion 324 to the width W3 of the closed loop is used to adjust a frequency ratio of the high-order resonant mode 404 to the fundamental resonant mode 402. According to the measurement result, if the ratio (W2/W3) is increased, the frequency ratio of the high-order resonant mode 404 to the fundamental resonant mode 402 will be decreased. Conversely, if the ratio (W2/W3) is decreased, the frequency ratio of the high-order resonant mode 404 to the fundamental resonant mode 402 will be increased. In the embodiment, since the grounding trace 320 is designed to have the smaller ratio (W2/W3), the antenna structure of the mobile device 300 can further cover another high band of the LTE Band 7 (from about 2400 MHz to 2700 MHz). In addition, the resonant mode 406 of the feeding trace 150 can be adjusted by changing the length of the feeding trace 150. A designer can control the operation bands of the antenna structure in the subject application according to the above method.

Figure 5:
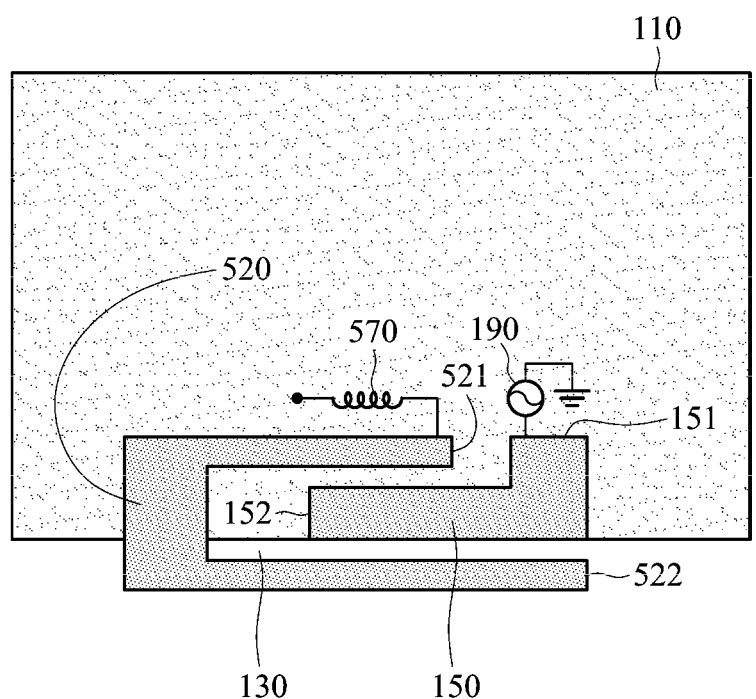
FIG. 5 is a diagram for illustrating a mobile device according to an embodiment of the invention.

FIG. 5 is a diagram for illustrating a mobile device 500 according to an embodiment of the invention. FIG. 5 is similar to FIG. 1. The difference from the embodiment of FIG. 1 is that the mobile device 500 further comprises an inductor 570 and that a grounding trace 520 of the mobile device 500 is shorter. As shown in FIG. 5, the grounding trace 520 has a shorted end 521 coupled to the ground plane 110 and an open end 522. The inductor 570 is coupled between the ground plane 110 and the shorted end 521 of the grounding trace 520. The grounding trace 520 may substantially have a U-shape. An antenna structure is formed by the grounding trace 520 and the feeding trace 150. The inductor 570 is configured to decrease the total length of the grounding trace 520, thereby minimizing the total size of the antenna structure (e.g., reduced by 12%). In some embodiments, the inductor 570 is a coil inductor, a chip inductor, or a variable inductor.

Figure 6:
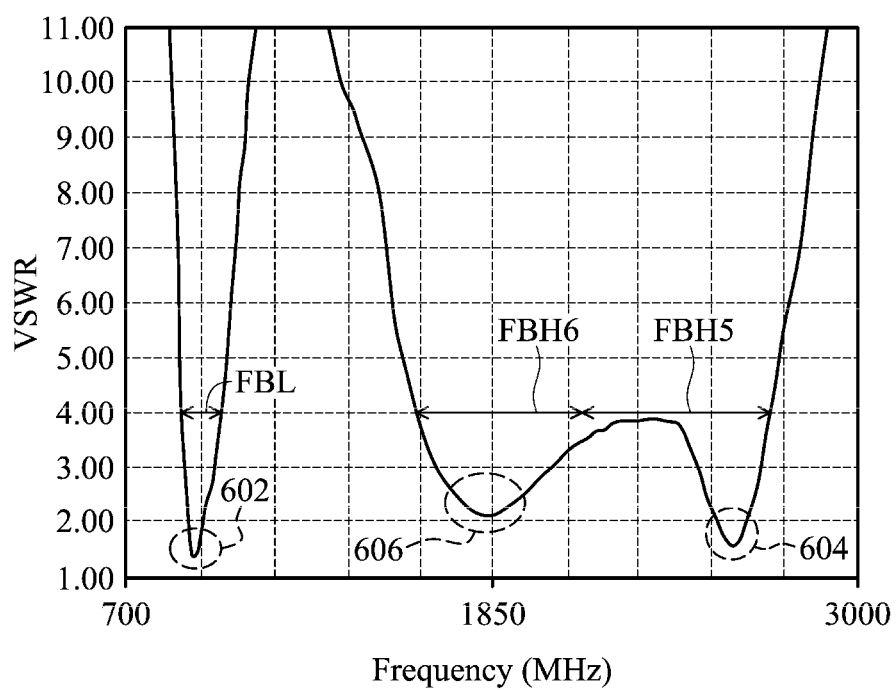
FIG. 6 is a diagram for illustrating a VSWR of an antenna structure of a mobile device according to an embodiment of the invention.

FIG. 6 is a diagram for illustrating a VSWR of the antenna structure of the mobile device 500 according to an embodiment of the invention. The horizontal axis represents operation frequency (MHz), and the vertical axis represents the VSWR. As shown in FIG. 5 and FIG. 6, a fundamental resonant mode 602 of the grounding trace 520 is excited to generate a low band FBL, a high-order resonant mode 604 of the grounding trace 520 is excited to generate a high band FBH5, and a resonant mode 606 of the feeding trace 150 is excited to generate another high band FBH6. In the embodiment, the low band FBL is approximately from 824 MHz to 960 MHz, the high band FBH5 is approximately from 2100 MHz to 2700 MHz, and the high band FBH6 is approximately from 1710 MHz to 2100 MHz. Accordingly, the antenna structure of the mobile device 500 can cover GSM850/900/1800/1900/WCDMA Band 1/LTE Band 7 bands.

Refer to FIG. 5 and FIG. 6 together. An inductance $L_d$ of the inductor 570 is set to control the high-order resonant mode 604, and the inductance $L_d$ is from 0 to $L_{Max}$. According to the measurement result, if the inductance is equal to 0, the lowest bound of the high-order resonant mode 604 can be reached, and if the inductance is equal to $L_{Max}$, the highest bound of the high-order resonant mode 604 can be reached. Understandably, if the inductance is increased, the antenna size will be further reduced, and the high-order resonant mode 604 will shift toward a high frequency of 2700 MHz, and conversely, if the inductance is decreased, the high-order resonant mode 604 will shift toward a low frequency. After the inductor 570 with the appropriate inductance is included, the antenna structure of the mobile device 500 can have a smaller size and further cover a high band of the LTE Band 7 (from about 2400

MHz to 2700 MHz). In some embodiments, the inductance $L_d$ of the inductor 570 is approximately from 0 nH to 6.8 nH ($L_{Max}$). In a preferred embodiment, the inductance of the inductor 570 is approximately equal to 2.7 nH. In addition, the resonant mode 606 of the feeding trace 150 can be adjusted by changing the length of the feeding trace 150. A designer can control the operation bands of the antenna structure in the subject application according to the above method.

Note that the subject application is not limited to that which is mentioned above. The element size, element parameters, and frequency ranges in all of the above embodiments may be adjusted by a designer according to different requirements. Since the embodiments are designed in similar ways, the mobile device and the antenna structure in all of the embodiments of the subject application can achieve similar performances after being finely tuned.

In the subject application, the antenna structure of the mobile device can cover a wideband, such as the GSM850/900/1800/1900/WCDMA Band 1/LTE Band 7 bands. The frequency range of the wideband can be easily controlled. According to the measurement result, the antenna structure of the subject application can further reduce the interference caused by the hand of a user, thereby maintaining good radiation performance.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A mobile device, comprising:
    a ground plane;
    a grounding trace, defining a notch, wherein the grounding trace has a shorted end coupled to the ground plane; and
    a feeding trace, disposed adjacent to the grounding trace, and having a feeding end and an open end, wherein an antenna structure is formed by the grounding trace and the feeding trace, the feeding end of the feeding trace is coupled to a signal source, and the open end of the feeding trace substantially extends into the notch of the grounding trace,
    wherein a fundamental resonant mode of the grounding trace is excited to generate a low band, a high-order resonant mode of the grounding trace is excited to generate a first high band, and a resonant mode of the feeding trace is excited to generate a second high band, and
    wherein the grounding trace and the feeding trace have vertical projections on the ground plane, and the vertical projections at least partially overlap with the ground plane.

2. The mobile device as claimed in claim 1, wherein the feeding trace substantially has an L-shape.

3. The mobile device as claimed in claim 1, wherein the notch of the grounding trace substantially has a rectangular shape.

4. The mobile device as claimed in claim 1, wherein the grounding trace substantially has a U-shape.

5. The mobile device as claimed in claim 4, wherein the grounding trace comprises a bent portion and a first extension portion, and the bent portion is adjacent to the shorted end of the grounding trace, and the grounding trace further has an open end, and the first extension portion is adjacent to the open end of the grounding trace.

6. The mobile device as claimed in claim 1, wherein a ratio of a width of the bent portion to a width of the first extension portion is used to adjust a frequency ratio of the high-order resonant mode to the fundamental resonant mode.

7. The mobile device as claimed in claim 1, wherein the low band is approximately from 824 MHz to 960 MHz, the first high band is approximately from 2100 MHz to 2400 MHz, and the second high band is approximately from 1710 MHz to 2100 MHz.

8. The mobile device as claimed in claim 1, wherein the grounding trace further has an open end.

9. The mobile device as claimed in claim 8, further comprising:
    an inductor, coupled between the ground plane and the shorted end of the grounding trace.

10. The mobile device as claimed in claim 9, wherein the inductor is configured to decrease a total length of the grounding trace.

11. The mobile device as claimed in claim 9, wherein an inductance of the inductor is approximately from 0 nH to 6.8 nH.

12. The mobile device as claimed in claim 9, wherein an inductance of the inductor is approximately equal to 2.7 nH.

13. A mobile device, comprising:
    a ground plane;
    a grounding trace, defining a notch, wherein the grounding trace has a shorted end coupled to the ground plane; and
    a feeding trace, disposed adjacent to the grounding trace, and having a feeding end and an open end, wherein an antenna structure is formed by the grounding trace and the feeding trace, the feeding end of the feeding trace is coupled to a signal source, and the open end of the feeding trace substantially extends into the notch of the grounding trace,
    wherein the grounding trace comprises a bent portion, a first extension portion, and a second extension portion, and the bent portion is adjacent to the shorted end of the grounding trace, and a closed loop is formed by the bent portion, the first extension portion, and the second extension portion.

14. The mobile device as claimed in claim 13, wherein the closed loop substantially has a rectangular shape.

15. The mobile device as claimed in claim 13, wherein a fundamental resonant mode of the grounding trace is excited to generate a low band, a high-order resonant mode of the grounding trace is excited to generate a first high band, and a resonant mode of the feeding trace is excited to generate a second high band.

16. The mobile device as claimed in claim 15, wherein a ratio of a width of the bent portion to a width of the closed loop is used to adjust a frequency ratio of the high-order resonant mode to the fundamental resonant mode.

17. The mobile device as claimed in claim 15, wherein the low band is approximately from 824 MHz to 960 MHz, the first high band is approximately from 2100 MHz to 2700 MHz, and the second high band is approximately from 1710 MHz to 2100 MHz.

* * * * *